United States Patent
Viklund et al.

(10) Patent No.: US 10,467,793 B2
(45) Date of Patent: Nov. 5, 2019

(54) COMPUTER IMPLEMENTED METHOD AND DEVICE

(71) Applicant: KING.COM LIMITED, St. Julians (MT)

(72) Inventors: David Viklund, Stockholm (SE); Driss Louriagli, Stockholm (SE); Pontus Lundwall, Stockholm (SE)

(73) Assignee: KING.COM LTD., St. Julians (MT)

( * ) Notice: Subject to any disclaimer, the term of this patent is extended or adjusted under 35 U.S.C. 154(b) by 0 days.

(21) Appl. No.: 15/891,614

(22) Filed: Feb. 8, 2018

(65) Prior Publication Data

US 2019/0244410 A1  Aug. 8, 2019

(51) Int. Cl.
G06T 13/40 (2011.01)
G06T 19/20 (2011.01)
G06T 17/20 (2006.01)
G06K 9/00 (2006.01)

(52) U.S. Cl.
CPC .......... *G06T 13/40* (2013.01); *G06K 9/00228* (2013.01); *G06T 17/205* (2013.01); *G06T 19/20* (2013.01); *G06T 2219/2004* (2013.01); *G06T 2219/2012* (2013.01); *G06T 2219/2016* (2013.01); *G06T 2219/2021* (2013.01)

(58) Field of Classification Search
None
See application file for complete search history.

(56) References Cited

U.S. PATENT DOCUMENTS

| | | | |
|---|---|---|---|
| 2007/0030339 A1* | 2/2007 | Findlay | G06Q 10/10 348/14.01 |
| 2010/0203968 A1* | 8/2010 | Gill | G06T 13/40 463/32 |
| 2012/0183238 A1* | 7/2012 | Savvides | G06K 9/00201 382/285 |

* cited by examiner

*Primary Examiner* — Frank S Chen
(74) *Attorney, Agent, or Firm* — Saul Ewing Arnstein & Lehr LLP

(57) ABSTRACT

In a computer implemented method, landmarks in a two dimensional image of a face are detected. In dependence on the detected landmarks, a three dimensional template head comprising texture, bones, animations and blend shapes is modified. The template head comprises bones corresponding to respective reference landmarks and which are moved in dependence on a respective detected landmark.

24 Claims, 22 Drawing Sheets

215

COMPUTER IMPLEMENTED METHOD AND DEVICE

FIELD OF THE INVENTION

Some embodiments relate to a computer implemented method and device which may be used to provide, for example, an avatar.

BACKGROUND OF THE INVENTION

Avatars provide a way to represent a person on the Internet, such as in a social media context, a game or any other suitable environment. An avatar may be synthetically generated. The avatar may be generated to resemble a person. Avatars may be provided in 2D or 3D. The avatar may be provided to represent a user or player of a computer implemented game, during play of that game.

There are different ways of generating avatar characters. Some require the user to pan a camera in front of themselves in a controlled manner or even to use special 3D cameras that are able to scan in three dimensions.

SUMMARY OF THE INVENTION

According to an aspect, there is provided a computer implemented method, comprising: detecting a plurality of landmarks in a two dimensional image of a face; and modifying a three dimensional template head consisting of texture, bones, animations and blend shapes in dependence on the detected landmarks in the two dimensional image, the template head comprising a plurality of bones corresponding to respective reference landmarks, the modifying comprising moving at least one bone corresponding to a reference landmark in dependence on a respective detected landmark.

The method may comprise using the modified three dimensional template to provide a three dimensional avatar with a representation of said face.

A single two dimensional image of the face may be used.

The method may be performed by a user device.

The method may comprise capturing the two dimensional image by the user device.

The method may be performed in a server.

The method may comprise receiving from a user device the two dimensional image.

The modifying may comprise modifying the position of the at least one bone only in X and Y dimensions.

The template head may be scaled in X, Y, and Z dimensions.

The method may comprise scaling a size of one of the two dimensional image and the template head to a size of the other of the two dimensional image and the template head.

The scaling may comprise determining a first distance between at least one pair of landmarks in the two dimensional image and scaling the two dimensional image in dependence on a comparison of the first distance with a distance between the corresponding landmarks in the template head.

At least one of the plurality of bones may comprise a weight, the weight determining if or how much the respective bone affects one or more other vertices.

At least some of the bones may be ordered in a hierarchy.

A maximum number of the vertices affecting a given bone may be two.

The method may comprise performing texture generation to provide a texture combined with the modified template head.

The performing texture generation may comprise mapping at least some triangles of the modified template head to a corresponding triangle in a texture to produce first image data.

The method may comprise identifying a region of interest in the first image data.

The method may comprise performing a masking operation to provide the region of interest.

The method may comprise infilling at least one area of the first image data.

The infilling may comprise filling the at least one area with at least one colour dependent on at least one colour of at least one adjacent area.

The method may comprise combining a template head texture with at least a part of the first image data or at least a part of data dependent on the first image data to provide a combined texture image.

The method may comprise adjusting the combined texture image in HSV space.

The method may comprise blending the combined texture image or image data dependent thereon.

According to another aspect, there is provided a device comprising at least one processor and at least one memory including computer program code, the at least one memory and the computer program code configured to, with the at least one processor, cause the device at least to: detect a plurality of landmarks in a two dimensional image of a face; and modify a three dimensional template head comprising texture, bones, animations and blend shapes in dependence on the detected landmarks in the two dimensional image, the template head comprising a plurality of bones corresponding to respective reference landmarks, the modifying comprising moving at least one bone corresponding to a reference landmark in dependence on a respective detected landmark.

The at least one memory and the computer program code may be configured, with the at least one processor, to use the modified three dimensional template to provide a three dimensional avatar with a representation of said face.

A single two dimensional image of the face may be used.

The device may be a user device.

The at least one memory and the computer program code may be configured, with the at least one processor, to capture the two dimensional image.

The device may be a server.

The at least one memory and the computer program code may be configured to, with the at least one processor to receive from a user device the two dimensional image.

The at least one memory and the computer program code may be configured to, with the at least one processor to modify the position of the at least one bone only in X and Y dimensions.

The template head may be scaled in X, Y, and Z dimensions.

The at least one memory and the computer program code may be configured, with the at least one processor, to scale a size of one of the two dimensional image and the template head to a size of the other of the two dimensional image and the template head.

The at least one memory and the computer program code may be configured to, with the at least one processor to determine a first distance between at least one pair of landmarks in the two dimensional image and scale the two dimensional image in dependence on a comparison of the first distance with a distance between the corresponding landmarks in the template head.

At least one of the plurality of bones may comprise a weight, the weight determining if or how much the respective bone affects one or more other vertices.

At least some of the bones may be ordered in a hierarchy.

A maximum number of the vertices affecting a given bone may be two.

The at least one memory and the computer program code may be configured, with the at least one processor, to perform texture generation to provide a texture combined with the modified template head.

The at least one memory and the computer program code may be configured, with the at least one processor, to performing texture generation by mapping at least some triangles of the modified template head to a corresponding triangle in a texture to produce first image data.

The at least one memory and the computer program code may be configured, with the at least one processor, to identify a region of interest in the first image data.

The at least one memory and the computer program code may be configured, with the at least one processor, to perform a masking operation to provide the region of interest.

The at least one memory and the computer program code may be configured, with the at least one processor, to infill at least one area of the first image data.

The at least one memory and the computer program code may be configured to, with the at least one processor to fill the at least one area with at least one colour dependent on at least one colour of at least one adjacent area.

The at least one memory and the computer program code may be configured, with the at least one processor, to combine a template head texture with at least a part of the first image data or at least a part of data dependent on the first image data to provide a combined texture image.

The at least one memory and the computer program code may be configured, with the at least one processor, to adjust the combined texture image in HSV space.

The at least one memory and the computer program code may be configured, with the at least one processor to blend the combined texture image or image data dependent thereon.

According to another aspect, there is provided computer implemented method, comprising: detecting a plurality of landmarks in a two dimensional image of a face; and modifying a three dimensional template head comprising bones, animations and blend shapes in dependence on the detected landmarks in the two dimensional image, the template head comprising a plurality of bones corresponding to respective reference landmarks, the modifying comprising moving at least one bone corresponding to a reference landmark in dependence on a respective detected landmark.

According to an aspect, there is provided a non-transitory computer program product comprising a computer-readable storage device including a computer-readable program, wherein the computer-readable program when executed on a processor causes the processor to: detect a plurality of landmarks in a two dimensional image of a face; and modify a three dimensional template head consisting of texture, bones, animations and blend shapes in dependence on the detected landmarks in the two dimensional image, the template head comprising a plurality of bones corresponding to respective reference landmarks, the modifying comprising moving at least one bone corresponding to a reference landmark in dependence on a respective detected landmark.

In another aspect a computer program product comprises computer executable code which when run is configured to provide any of the above methods.

A computer program comprising program code means adapted to perform the method(s) may also be provided. The computer program may be stored and/or otherwise embodied by means of a carrier medium.

In the above, many different embodiments have been described. It should be appreciated that further embodiments may be provided by the combination of any two or more of the embodiments described above.

Various other aspects and further embodiments are also described in the following detailed description and in the attached claims.

BRIEF DESCRIPTION OF DRAWINGS

Reference will now be made by way of example only to the accompanying drawings in which.

DETAILED DESCRIPTION OF EMBODIMENTS

It is an aim of some embodiments to provide an avatar in a simplified manner. In some embodiments, an avatar may be generated with the user providing relatively little input.

In some embodiments, an avatar may be created with a single photographic image. The photographic image may be a 2D image. The photographic image may be a selfie or the like.

Some embodiments allow a realistic looking avatar head using on a single 2D image of average quality (e.g. a selfie or the like) to be generated.

Some embodiments aim to provide an avatar with minimum user effort, i.e. the user should only need to supply little input and invest no time in getting the desired avatar.

Some embodiments, may aim to render the head with a relatively few number of pixels, for example 100×100 pixels or so. However, it should be appreciated that in some embodiments, a larger or a smaller number of pixels may be used.

In some embodiments, the photographic image may be 2D image and the avatar provided by the method may be a 3D avatar. The 3D avatar may be provided using predetermined data in combination with a single 2D portrait image taken front on. The predetermined data may be, for example, a template head.

In some embodiments, the avatar may be used in applications provided by mobile devices or the like.

In some embodiments, the avatar may be generated from a computer running on at least one processor of the mobile device or the like.

In other embodiments, the image taken or available to the mobile device or the like may be sent to a server which generates the avatar.

In some embodiments, the avatar image may be relatively small. For example, the avatar image may be of the order of 100×100 pixels or the like, as mentioned previously. This size of image may be appropriate when for example using applications on mobile devices or where such a size of avatar is appropriate for the application.

In some embodiments, a complete head mesh template is used. The head mesh template has a flexible skeleton that is transformed based on a mapping with respect to an image of a source face. The source face may be painted onto the mesh.

In the following, reference is made to bones and joints. It should be appreciated that these terms, as used in the context of 3D modelling are synonyms.

Figure 1:
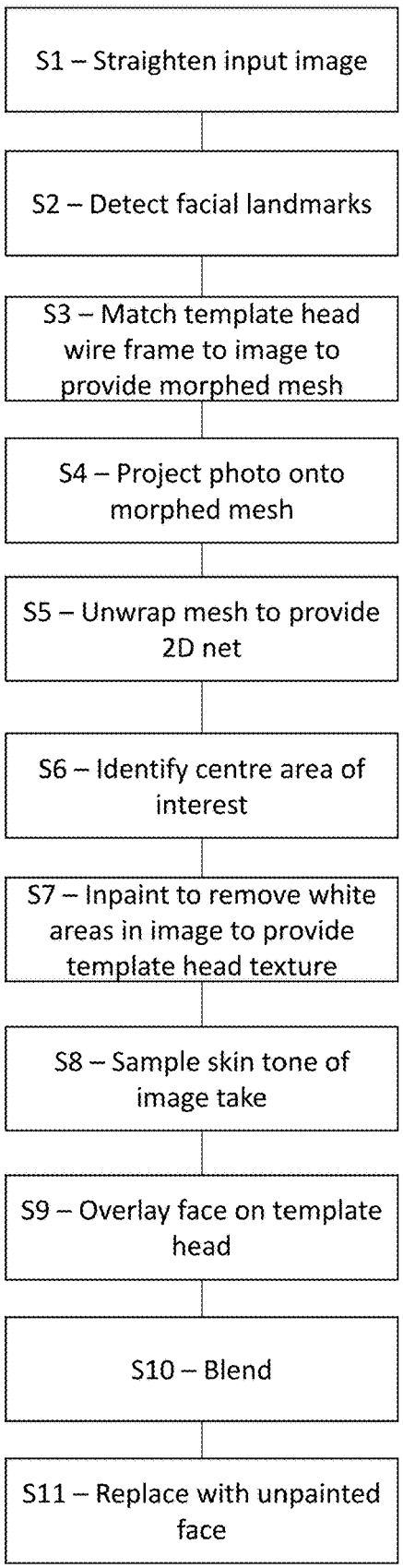
FIG. 1 shows a method of some embodiments.

Reference is made to FIGS. 1, 2A to 2M and 3A to 3E. In particular, FIG. 1 shows a method used in some embodiments. FIGS. 2A to 2M illustrate some of the processing of images corresponding to the steps. FIGS. 3A to 3E illustrate some of the templates.

Figure 2A:
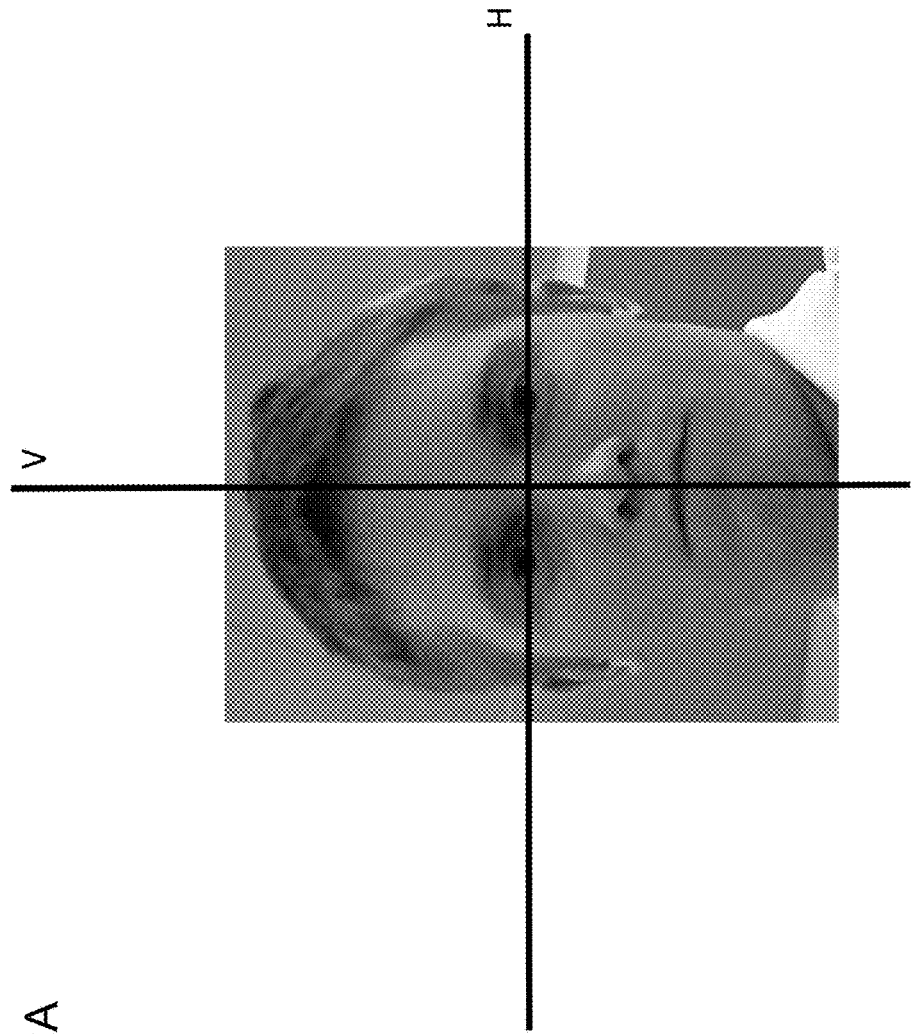
FIG. 2A shows an image from which an avatar is created.

In step S1, an image is taken. This is a straightforward 2D image such as a selfie or the like. The 2D image may be scaled to meet one or more predetermined sizes. The predetermined size may correspond to the size of a template head. The 2D image may be a portrait, which may be taken front on. In the first step, the input image is straightened. In particular, the input image is rotated in 2 dimensions so as to be level. In other words, an approximately horizontal line H passes through the eyes and approximate vertical line V passes through the longitudinal axis of the face. This initial image is shown in FIG. 2A.

The scaling may in an alternative embodiment relate to a distance between two detected landmarks on the image. This distance between the two detected landmarks may be determined. The 2D image may be scaled based on a determined relationship between the determined distance between the two landmarks and a distance between two joints identified as corresponding to the landmarks on the 3D template head. Consider the following example. If the distance between the ears on the 2D image is 4 cm and the distance between the points on the 3D template head corresponding to the landmarks is 2 cm, the image may be scaled down to 50 percent of its original size.

The distance between the corresponding landmarks of the template may be determine or may have previously been determined and so is stored in memory.

It should be appreciated in one embodiment, only one pair of corresponding landmarks are used in embodiments. In other embodiments, more than one pair of corresponding landmarks are used.

The scaling of the 2D image may in some embodiments be done around a fixed central point. That point may be any suitable point and may be for example be the centre of the jawbone.

In other embodiments, after the 2D image has been scaled, the image is arranged such that a point on the 2D image is aligned with a corresponding point on the 3D template head. For example the centre of the jawbone may be aligned with the centre of the jawbone associated with a representation of the 3D template head.

It should be appreciated that step S1 may be give a rough or coarse suitable starting point and allow all the bones on the template head to be generally in the right vicinity and be adjusted only minimally or more finely in the subsequent steps.

It should be appreciated that step S1 and S2 may be at least partially combined.

It should be appreciated, that the straightening of the image may not be required if it is determined that the image is aligned with respect to the template.

In some embodiments, the template head may be aligned with the 2D image instead of the 2D image being aligned with the template head.

The scaling of the 2D image to the template head may be advantageous in reducing processing complexity and/or improving the appearance of a resulting avatar. The number of bones provided in the template head may be larger than the number of landmarks. The scaling may be used to move a number of the bones in the template head. This may move bones which are not associated directly with a landmark. This may allow a more realistic avatar to be provided in some embodiments.

The scaling may allow for the template head to have bones which do not have a corresponding landmark. These bones which do not have a corresponding landmark may for example be used in creating facial animations using the template head. This may keep the processing requirements low. This may be advantageous as it may allow for those bones without the corresponding landmark to be repositioned without disturbing the distinguishing features of the face when creating animations. This may be used when creating facial expressions such as smiles or the like. For example, bones without corresponding landmarks may be repositioned to make facial expressions with a minimum of processing requirements and still retain a good facial likeness.

It should be appreciated that orientation of the template head may differ from that shown in the Figures in that for example the axis passing through the ears may be angled with respect to the x axis and not generally parallel in the example embodiments.

This step may allow the head in the 2D image and the 3D template head to be aligned to the same angle. The template head may be the reference by which the head in the 2D image may be transformed or straightened. In the alternative, the 3D template head be transformed to align to the angle of the head in the 2D image.

Figure 2B:
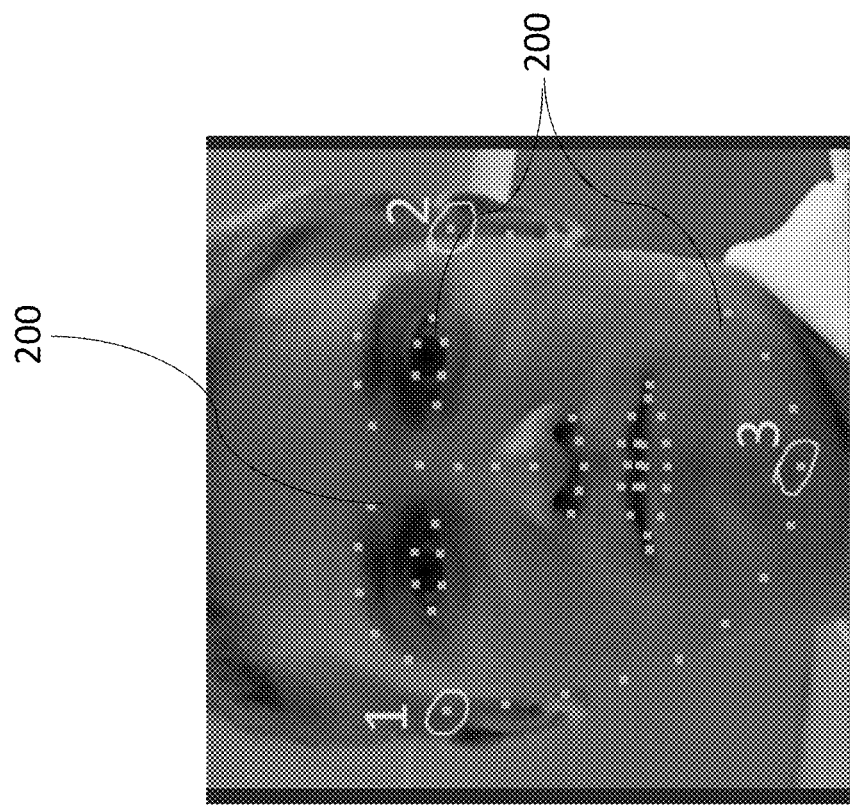
FIG. 2B shows identified landmarks in the image of FIG. 2A.
Figure 3A:
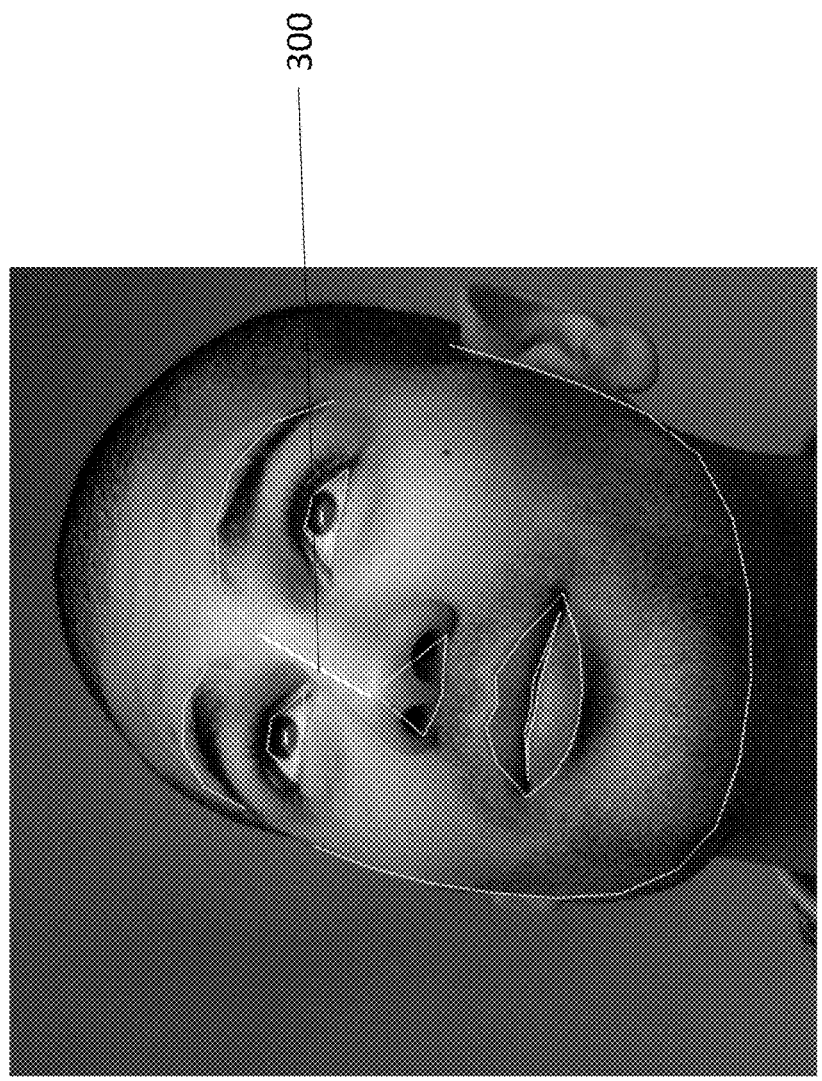
FIG. 3A shows detected landmarks joined by lines in a reference image.

In step S2, a landmark detection algorithm is used. The landmarks are detected by a trained neural network and are visualised. Any suitable software may be used for this. By way of example only, a dlib c++ library may be used for this task in some embodiments. It should be appreciated that any suitable algorithm for face landmark detection may alternatively be used. In this example landmark detection algorithm, it first detects any faces in an image. The algorithm then maps 68 landmark points on key positions of each face. In some embodiments, the straightening and/or scaling of the image may be part of the landmark detection algorithm. In that case, step S1 will be performed as part of step S2. FIG. 3A shows all detected landmarks joined by lines referenced 300 in a reference image. These landmarks for the image being used to create the 3D avatar are shown in FIG. 2B and are referenced 200. The bones referenced 1 and 2 are opposed sides of the head and can be considered to be the extreme landmarks along the horizontal line of FIG. 2A. Bone 3 can be considered to be the lowest landmark along the vertical line of FIG. 2A.

In step S3, a template head wire form is matched to the image to provide a morphed mesh. In some embodiments, the landmarks are used together with a generic template head. Steps S3 and S4 are explained further in FIG. 6.

Figure 3B:
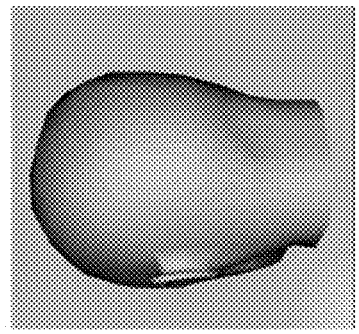
FIG. 3B shows front, side and rear views of a generic template head.
Figure 3B:
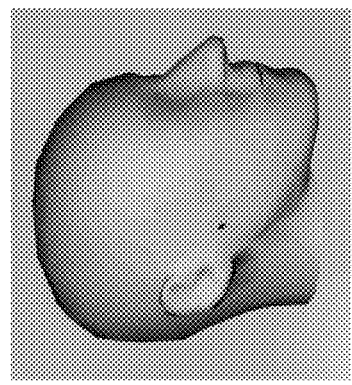
Figure 3B:
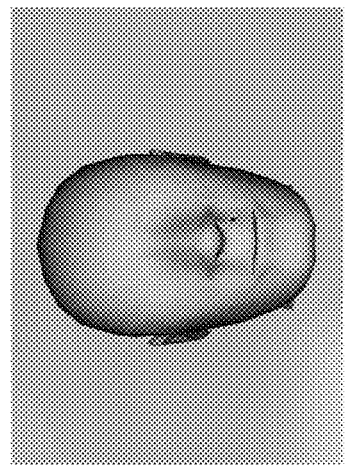

A generic template head is show in FIG. 3B. The template head may be viewed from the front, orthographically projected and initially should match the photo as close as possible without deformation. It should be appreciated that there may be a single generic template head or a set of two or more generic template heads, one of which may be selected. In some embodiments, the generic template head may be three dimensional. In FIG. 3B, a front view, a side view and a back view of the generic template head is shown.

Figure 3C:
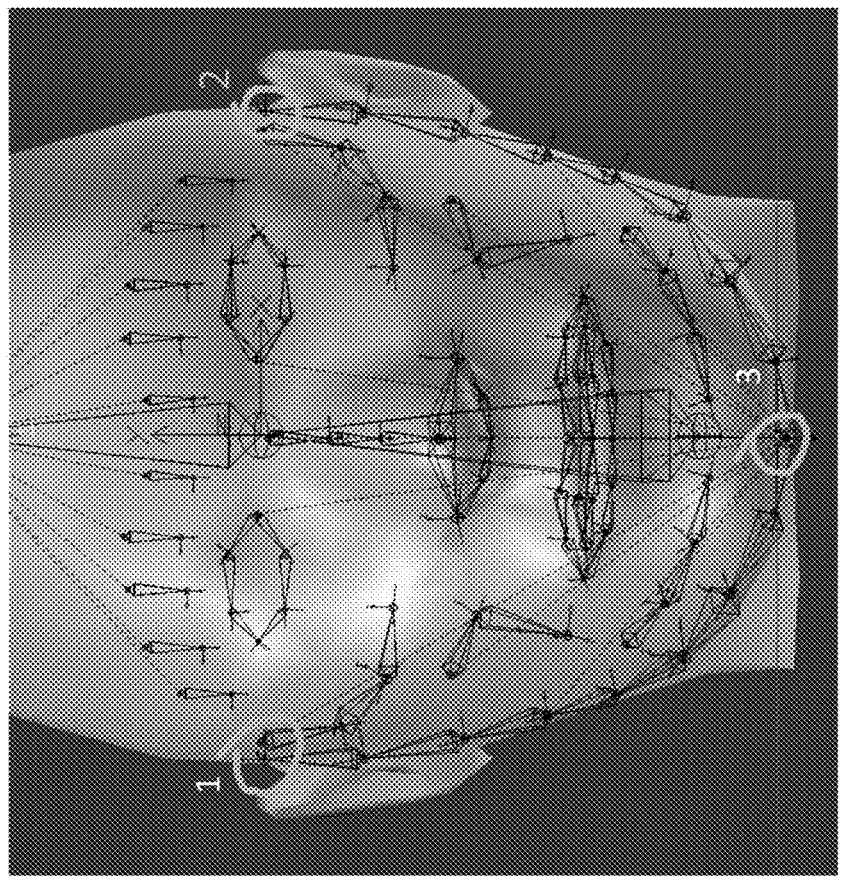
FIG. 3C shows the generic template head with an arrangement of bones.

The generic template head without any texture is shown in FIG. 3C but the arrangement of bones is visible.

It may be appreciated that the bones are interrelated features Moving one element of a bone may in turn move any number of vertices near (or far) to the moved bone.

Bones 1, 2 and 3 are shown on the template head of FIG. 3C. Moving a bone, such as for example, one of bones 1, 2 and 3 may cause corresponding movement of surrounding vertices by a weighted factor.

The template has "bones" (also known as "joints") corresponding to each of the landmarks. A bone effects none, one or more of the vertices in a model by a specific weight. The weight may be visualized for each vertex. These bones are ordered in a hierarchy where each bone can have one parent, creating a skeleton for the model.

In some embodiments, the number of bones per vertex is limited for performance reasons. For example, in some embodiments, the maximum number of joints per vertex is set at 2. For computational ease, it may thus be desirable to limit the number of bones or joints that can affect each vertex. In one embodiment this constraint may be two. For each weight that needs to be considered, more computations are needed per vertex to decide where it is.

It should be appreciated that the number of bones per vertex may not be limited to any particular maximum in some embodiments. In other embodiments, the maximum may be set to a number different to 2.

The scale of the skeleton of FIG. 3C is adjusted to the same aspect as the photograph of FIG. 2A. This is illustrated with reference FIG. 2B which shows the three landmarks, 1, 2 and 3. These landmarks and the bones 1, 2 and 3 in FIG. 3C are matched by scaling and moving the image containing the landmarks. This provides an input photo with landmarks that match the template head.

By applying this scale to the input photograph, the head mesh will have roughly the same size and position as the head in the photograph of FIG. 2B. It is desirable that the photograph and the mesh overlap and are aligned as close as possible for a good result.

Figure 3D:
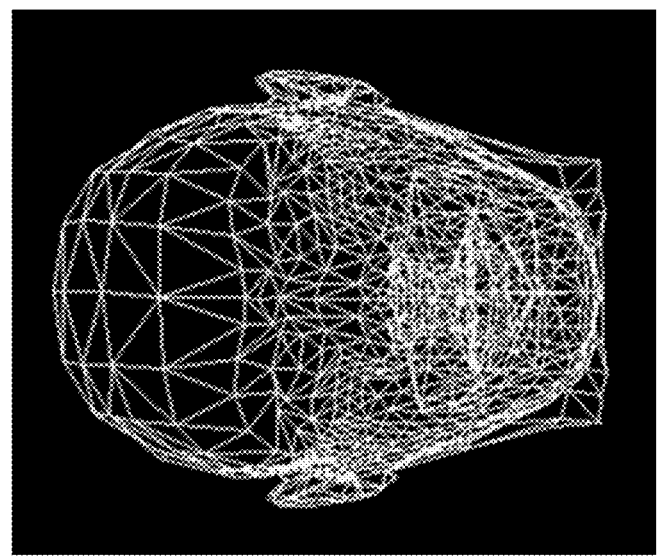
FIG. 3D shows a morphed template head visualized on top of the image as a black mesh.
Figure 3E:
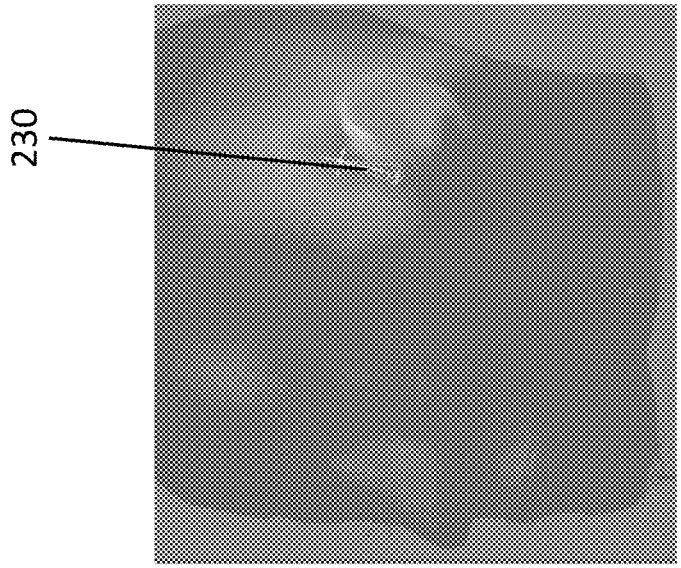
FIG. 3E illustrates how movement of a vertex can deform the head.
Figure 3E:
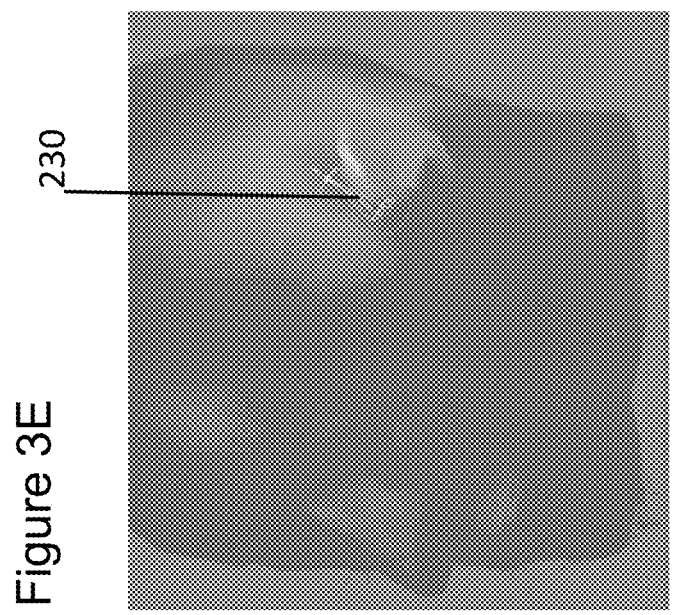

In step S4, the morphed template head is visualized on top of the image as a black mesh. This is shown in FIG. 3D. Steps S3 and S4 are explained further in FIG. 6, as previously mentioned.

Figure 2C:
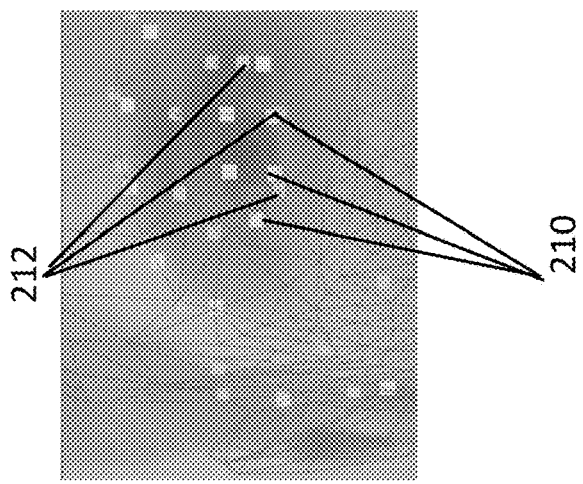
FIG. 2C shows a first image before there is matching of a subset of landmarks and the image after there has been matching of the subset of landmarks.
Figure 2C:
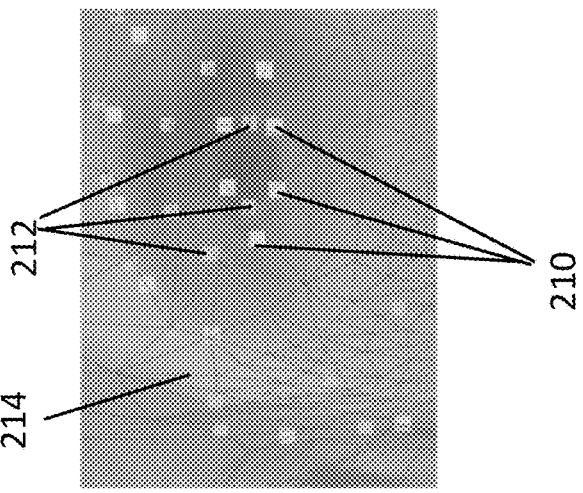

Thus, the size and position of the head is matched and then the bones are moved from the detected positions to corresponding positions on the template head. With the model/skeleton aligned to the input photograph, the next step is to compute differences to describe how much each of the 68 bones in the skeleton need to move to make the generic template head match the likely geometry of the face in the input photograph. Thus the bones in the template are moved to respective landmark positions. This moves any vertices bound by the bones and deforms the head in a relatively symmetrical and realistic way. This is described with reference to FIG. 3E which shows how movement of a vertex 230 can deform the head, in this case the position of the ear is transformed. Thus, the projected model and photographs are aligned. The larger squares 200 represent the 68 landmarks of the photo which are visualised. As shown in FIG. 2C, the edge 214 represent an edge in the orthogonal projection of the template head and the smaller squares 212 represents the bones in the template head. The smaller and lighter squares 210 represent the landmarks detected in the photograph.

The bones in the template head are moved which causes the vertices of the template head to be moved. Thus, the detected landmarks referenced 210 cause the template to be modified to resemble the features of the photographed user. For example, the bones controlling the vertices of the eyes, nose and mouth will be moved to correspond to the location of the detected landmarks in the photograph. Consider FIG. 2C which shows part of the eye area of the image with the reference landmarks 212 of the template head and the detected landmarks 210 in the image. In this example the movement of three bones is shown to illustrate the influence on the model wireframe. The first image shows before there is matching of the reference landmarks to the detected landmarks and the second image shows that there has been some matching of the reference and detected landmarks. In embodiments, some or all of the reference landmarks are moved so as to coincide with the detected landmarks. The vertices which are affected by these bones will move by different amounts depending on the weights that have been assigned for each bone. Each vertex may have a number of bone indexes and weights, in some embodiments. If a weight is zero, it is not affected by any bone. Thus any vertex indexed to a bone but has zero-weight is equivalent to that same vertex not indexed to that bone at all.

Figure 2D:
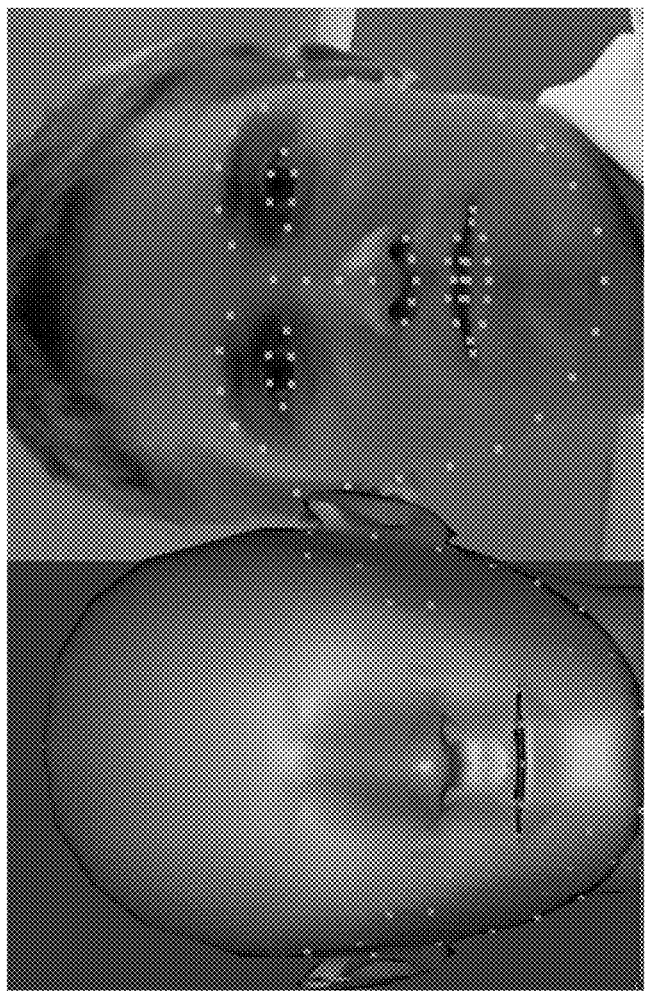
FIG. 2D shows on the right the template head with landmarks and the photograph on the right with landmarks.
Figure 2E:
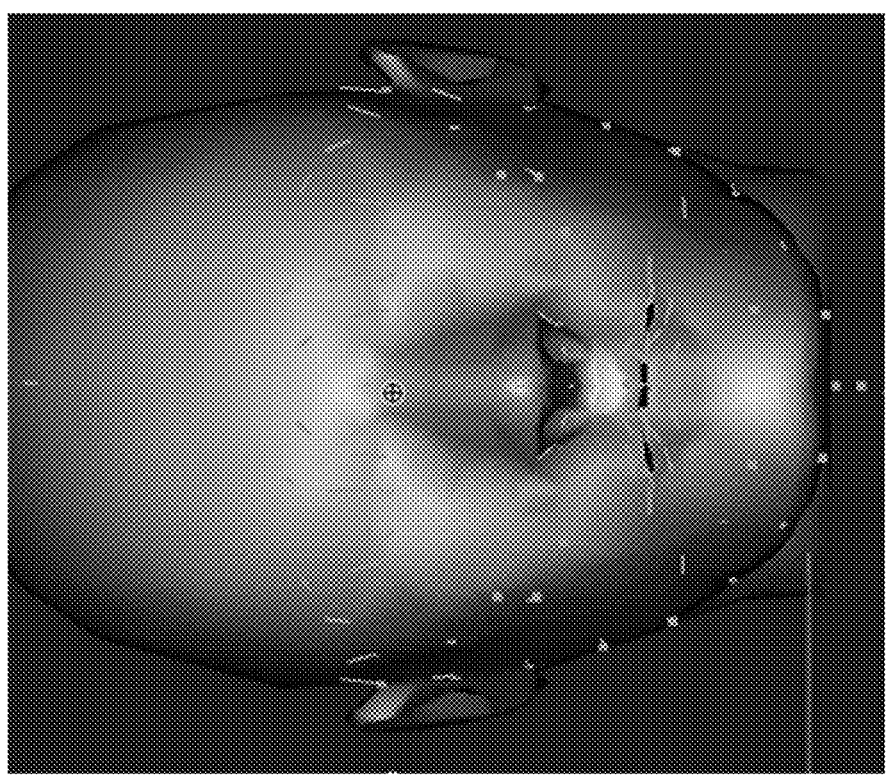
FIG. 2E shows the updated template head.
Figure 2F:
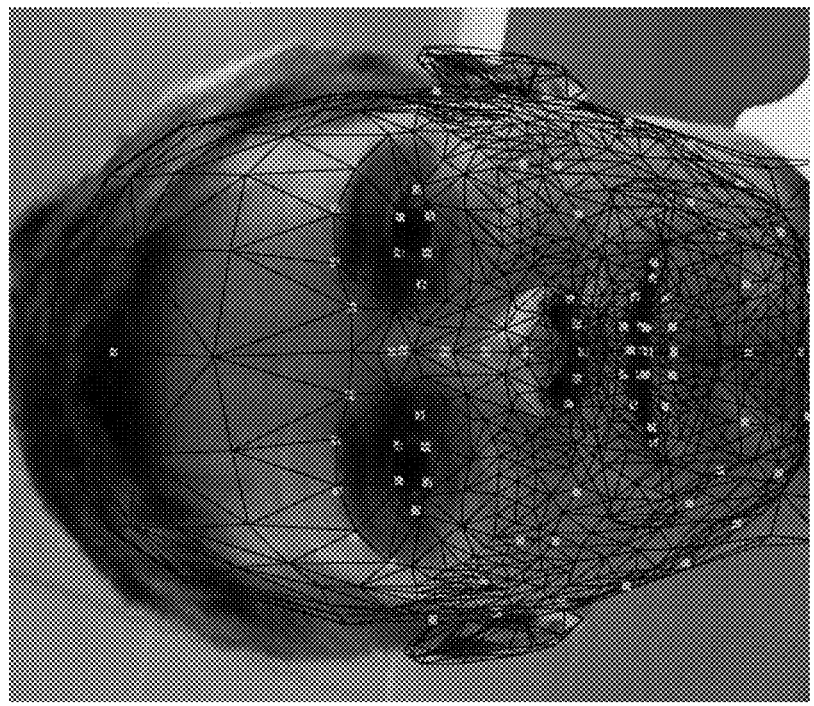
FIG. 2F shows a morphed mesh head.

Moving all these bones the determined amount will produce an updated head/face as shown in FIG. 2E that is better matched to the input photo, shown on the right of FIG. 2D, in regard to where the mouth, eyes and nose are located. The relative size may closer match the photo. For reference, the template head is shown on the left of FIG. 2D. Thus, in this step, a morphed version of the template head that resembles what is shown in the image may be provided. Alternatively or additionally a morphed head mesh is provided and this is shown in FIG. 2F. In this morphed head mesh, the reference landmarks have been moved to coincide with the corresponding detected landmarks.

Figure 4C:
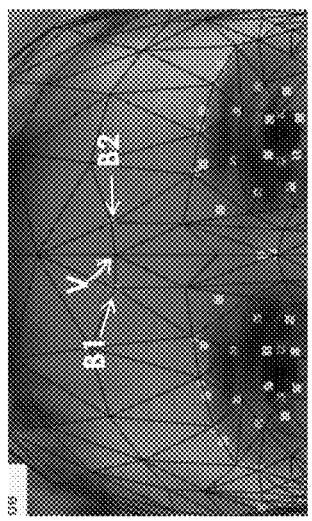
FIG. 4C illustrates how movement of another bone affects nearby vertices and edges of a head mesh.
Figure 4B:
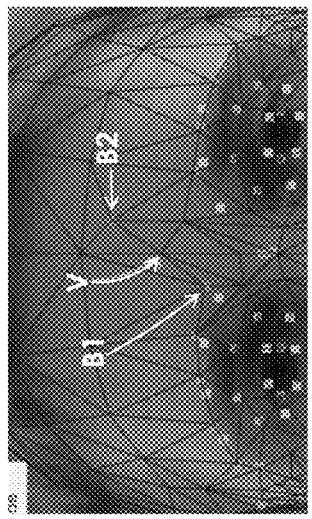
FIG. 4B illustrates how movement of a bone affects nearby vertices and edges of a head mesh.
Figure 4A:
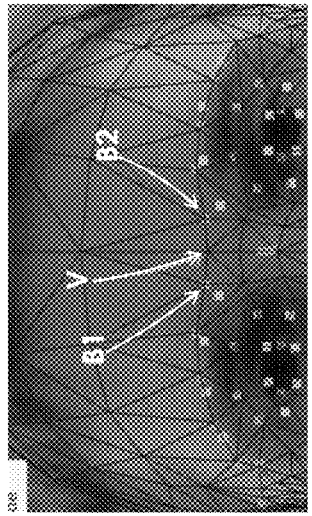
FIG. 4A illustrates intersection of edges of a morphed head mesh.

Vertex positions are defined by a base position and they are moved when the bones that controls them are moved, is multiplied by a factor, the weight. If the vertex is moved the same distance as the bone, the weight is 1, or 100%. If the vertex is not moved when the bone is moved, the weight is 0 or 0%. In FIG. 4A we see an arrow pointing to an intersection of edges. In the centre of all these edges, there is a vertex located, referenced V. This position of V is controlled by 2 bones, B1 and B2. Both B1 and B2 control V by approximately 50% each. In FIG. 4B, B2 is moved up some distance. It can be seen that V is also moved upwards, but not as much as B2, but rather 50% of the distance B2 was moved. In FIG. 4C, B1 is also moved upward. This causes V to be moved even further, but not as much as B1 is moved, but rather 50% of the distance B1 is moved. Note that B1 and B2 also controls a number of other vertices, each with different weights.

Figure 2G:
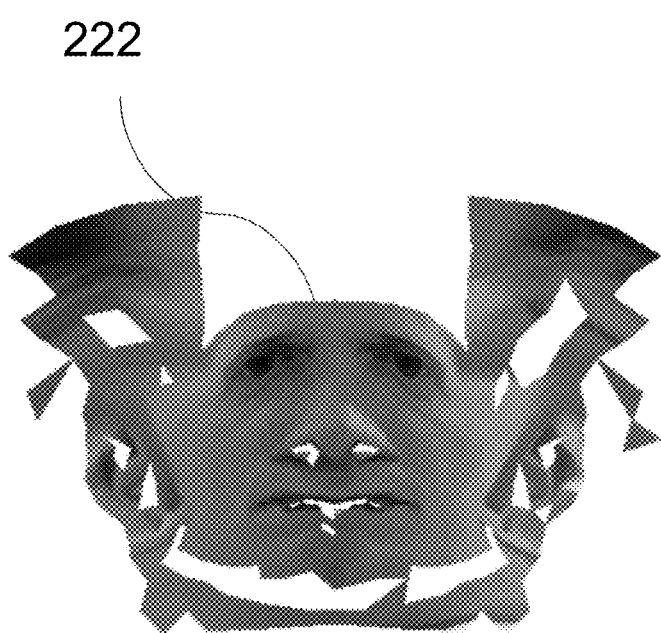
FIG. 2G shows an image produced by projection painting.

In step S5, the mesh is unwrapped to provide a 2D net. This is configured in the template mesh and is not unique to the specific photo taken. This step projects the photo onto the morphed mesh. This is shown in FIG. 2G. A texture is required to provide a realistic image. For any giving photo, most of the head will remain the same. For example, the hair, or the back of the head is generally the same but the face part needs to be updated. The texture is to be updated to match the colour tone of the acquired face.

To produce the first step of the texture, the newly created morphed head mesh is used and forward facing triangles of the head mesh are used. Triangles in 3D modelling may sometimes only made visible when facing forward. The forward direction may be determined by the order or the points and the resulting normal vector. Any triangles located at the back of the head or inside the mouth are not considered since they are not part of the initial photograph. This list of triangles is gone through, reading corresponding pixels from the image and mapping them to the corresponding triangle in the texture. This is dictated by the UV mapping of the mesh model. This is known as projection painting and produces an image 222 such as shown in FIG. 2G. UV mapping refers to a method of mapping one or more textures (2D images) to a 3D model. This means specifying which areas of the texture image will be used to colour the area of a given triangle. Each vertex of the triangle will contain one u and one v coordinate (normally ranging from 0 to 1) that specifies a node in the texture. U and V are thus x, y coordinates in texture space.

Figure 2H:
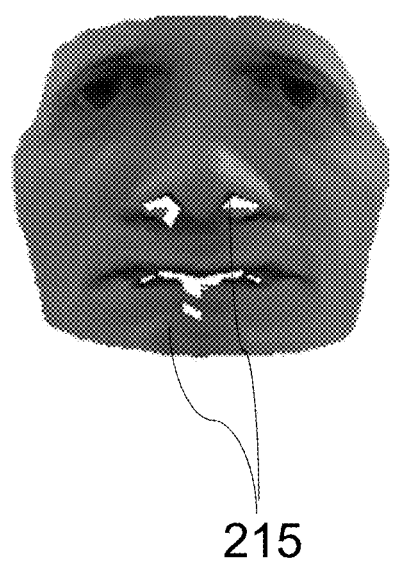
FIG. 2H shows a centre region of interest of the image of FIG. 2G.

In step S6, the centre area of interest is identified. In some embodiments, not all of the head is of interest, only the face part of the head. A centre piece of the face is thus masked out. The other parts of the head can be contaminated with hair and contains a lot of gaps 215. This is shown in FIG. 2H.

Figure 2I:
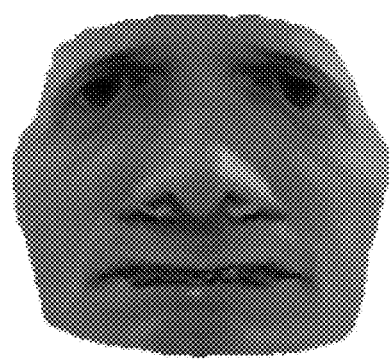
FIG. 2I shows the centre region of interest of FIG. 2H, after inpainting.

In step S7, an inpaint method is used to remove white areas in the image to provide a template head texture. These white areas are triangles present in the morphed mesh but not in the source photograph (for example inside of nose and mouth or triangles that have been flipped during morphing). Inpainting is used to clone nearby areas to fill these areas with realistic colours. This step may require a reasonable amount of the processing time, depending on how many pixels need to be inpainted. This is shown in FIG. 2I. The result provides a good result as far as the core face part of the texture is concerned, in some embodiments.

Figure 2J:
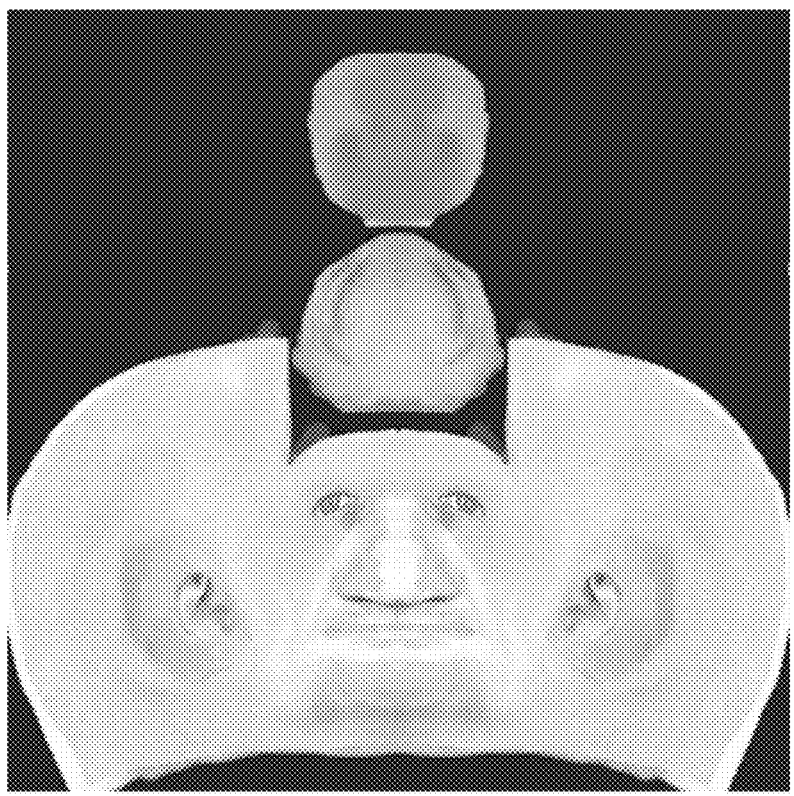
FIG. 2J shows a template head texture.
Figure 2K:
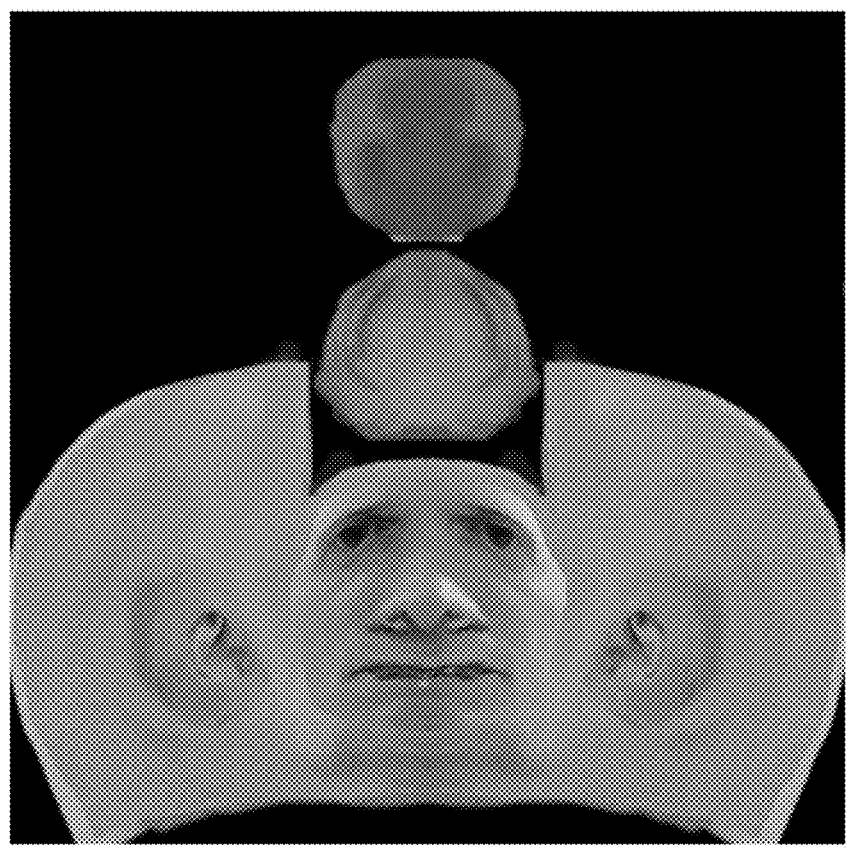
FIG. 2K shows the template head texture modified with the face of FIG. 2I.

In step S8, a sample skin tone of the image is taken. FIG. 2J shows the template head texture in its raw form. It contains a template face area at this point, but this part of the template is overwritten. The skin tone of this image is sampled and matched in HSV space to the average of the image shown in FIG. 2I. This is done by measuring and producing an average of key areas of each image. The template head texture shown in its raw form in FIG. 2J will have the face part of it overwritten as seen in FIG. 2K.

In step S9, the face created in step S8, is overlaid on the template head. In some embodiments, the adjusted face or the inpainted face is not overlaid at this point to determine the adjustments required. In other embodiments, the adjusted face or inpainted face is used. As can be seen from FIG. 2K, this may create seaming between the overlaid face and the rest of the head.

Figure 2L:
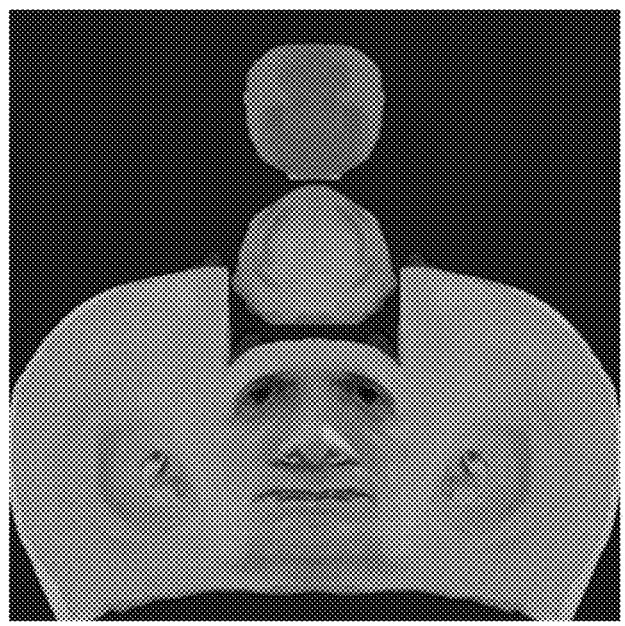
FIG. 2L shows the texture of FIG. 2K after blending.

In step S10, a technique known as Poisson blending or Poisson Image Editing may be used. This reduces or even eliminates the visible seams between the two pieces by applying a blending technique. This may be computationally intensive. For this reason, at least this step may be performed by a server or any other device with high computational power, or even on a device with lower computational power but it will take longer time, in some embodiments. This results of this blending is shown in FIG. 2L.

Figure 2M:
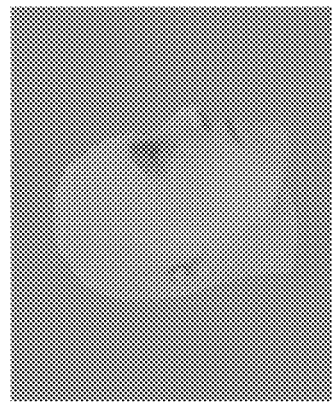
FIG. 2M shows views of the morphed head to which the generated texture has been applied.
Figure 2M:
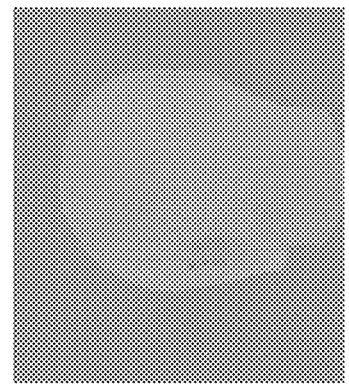
Figure 2M:
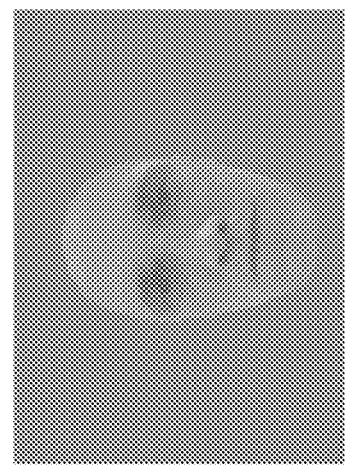

In step S11, the generated textured is applied to the morphed head to give the result shown in FIG. 2M. The front view is dependent on the photograph used to create the avatar. The side and back views shown are the more generic template views but with skin tone adjusted.

In some embodiments, the avatar generated by the above described technique may be animated in some embodiments. The animations may be defined in the template mesh and is then usable by all morphed heads.

In some embodiments, shape keys or bone transformation matrix animations may be used to modify the head into showing different facial expressions. This may be relatively easy to implement and provides good results. This uses the morphed version of template head generated for the captured image, for example as shown in FIG. 2E.

In some embodiments, the avatars are created without hair. In some embodiments, a library of ready hair styles that can be user selected may be provided. The selected hair styles can then be positioned on the head. It should be appreciated that haircuts, beards, nose rings, glasses, hats or the like behave in a similar manner. The hairstyle or the like would follow any movement of the avatar.

This selection may be by a user or by a computer program.

In some embodiments, estimation of the accessory (hair style, beard, hat etc.) can performed from the captured image and synthesised.

Accordingly in some embodiments, one or more accessories may be combined with the generated avatar. The accessories may comprise one or more of hair, headwear, jewelry, scarves and/or the like. In some embodiments, it is desirable that when the face moves, the one or more accessories such as hair etc. should move with the face.

In some embodiments, this is addressed by providing each accessory with the same kind of skeleton as the head. The supplied skeleton for the accessory is then switched with the skeleton determined for the head. In this way the accessory would behave just like the head at all times.

The dlib approach of producing landmarks uses a database with training of landmarks and faces. This data may be around 100 MB. In some embodiments, this may not compress particularly well. Some embodiments may have this method compiled into a game or other suitable application. In other embodiments, this method may be performed in a server or the like and is downloaded from the server to the user device. The image may be uploaded to a server or the like.

In some embodiments, the 3D avatar may be created on the user device. The user device may perform the steps as described in FIG. 1. The user device may optimise the method to reduce the computational complexity of the method by, for example, only matching the template head wire frame to the 2D image in the X and Y dimensions of the template.

Furthermore, it may be understood that specific steps which are particularly computationally complex, such as the process described in S10, may be performed at a server or at the user device.

In some embodiments, the 3D avatar may be created on a server, based on an image provided by a user device. It may be understood that the process followed by the server is a variant of that discussed in relation to the flow chart of FIG. 1.

Figure 5:
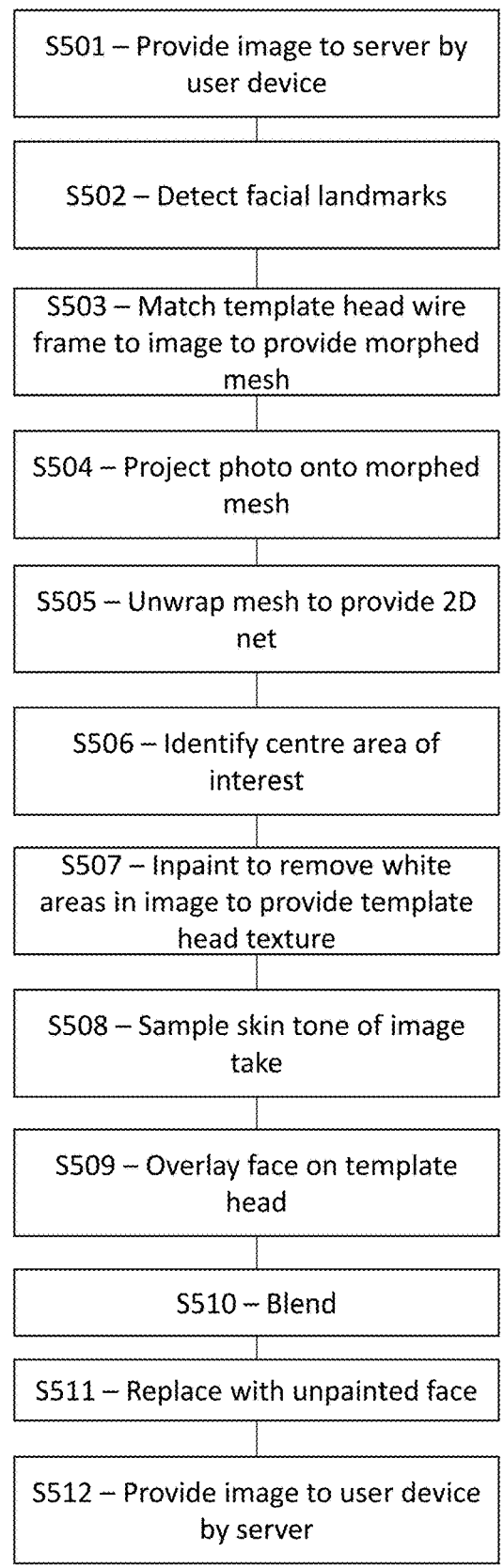
FIG. 5 shows the process of the method being performed at a server.

Reference is made to FIG. 5 which shows a method performed by a server in some embodiments.

In step S501, an image is transmitted to a server from a user device. This is a straightforward 2D image such as a selfie or the like. The user device may scale and straighten the 2D image before transmitting the image to the server. Alternatively, it may be understood that the straightening and scaling process may be performed on the 2D image at the server. The predetermined size may correspond to the size of a template head. The 2D image may be a portrait, which may be taken front on. In particular, the input image is rotated in 2 dimensions so as to be level as described earlier.

In step S502, a landmark detection algorithm is used as described earlier. The landmark detection is performed by the server on the 2D image.

In step S503, a template head is matched to the image to provide a morphed mesh as discussed earlier. The template head orthographic view may be matched to the image in the X and Y dimensions of the 2D image at the server. Each bone of the template head may be defined in 3 dimensional space and that may be expressed by a x, y, z coordinate. In one embodiment, only the x and y coordinates of a particular bone may be altered in dependence on the capture 2D image. The z coordinate may be unchanged.

The respective differences of the landmarks in the photograph are divided by the respective differences from the bones in the template head to produce a scale which can be applied to the skeleton. By applying this scale the size of the head in the photograph will be roughly the size as the head mesh.

In step S504, the morphed template head is visualized orthographically on top of the image. The size and position of the head is matched by scaling and moving the photograph and then the bones of the template head are moved from the detected positions to corresponding positions of the landmarks of the photograph by the server.

In step S505, the mesh is unwrapped to provide a 2D UV-map at the server. This step projects the photo onto the morphed mesh as earlier described.

In step S506, the centre area of interest is identified by the server. In some embodiments, not all of the photograph is of interest, only the face part of the head as described earlier.

In step S507, an inpaint method is used by the server to remove white areas in the image to provide a template head texture as described earlier.

In step S508, a sample skin tone of the image is taken by the server. The skin tone of this image is sampled and matched as described earlier.

In step S509, the face created in step S508, is overlaid on the template head. In some embodiments, the adjusted face or the inpainted face is not overlaid at this point to determine the adjustments required. In other embodiments, the adjusted face or inpainted face is used.

In step S510, Poisson blending or Poisson Image Editing may be used by the server.

In step S511, the generated texture is applied to the morphed head by the server. It may be understood that the textured morphed head is a 3D avatar ready for providing to a user device. In some embodiments, a hair style may be determined and applied by the server.

In step S512, the generated avatar is transmitted by the server to the user device. Transmitting by the server to the user device may be in response to a request from the user device. In some embodiments, the avatars are received without hair. It may be understood that in some embodiments, a library of ready hair styles that can be user selected may be provided at the user device. The selected hair styles can then be positioned on the head. It should be appreciated that haircuts, beards, nose rings, glasses, hats or the like behave in a similar manner. The hairstyle or the like would follow any movement of the avatar.

In one modification, the z coordinate will also be adjusted in step S503.

In some embodiments, the user device sends requests to the server, via http, until the processing completed or failed (for example no face was found or another other problem occurred). This avoids having the calling device waiting on a single http request until the processing was completed. In other embodiments, the server may push the generated avatar to the user device.

It should be appreciated, that as mentioned previously, a server is not required and the generation of the head is done on a mobile device or other user device.

If a server is used, that server may manage a work queue and process photos in parallel along with reporting status, serving data and accepting new photos.

Figure 6:
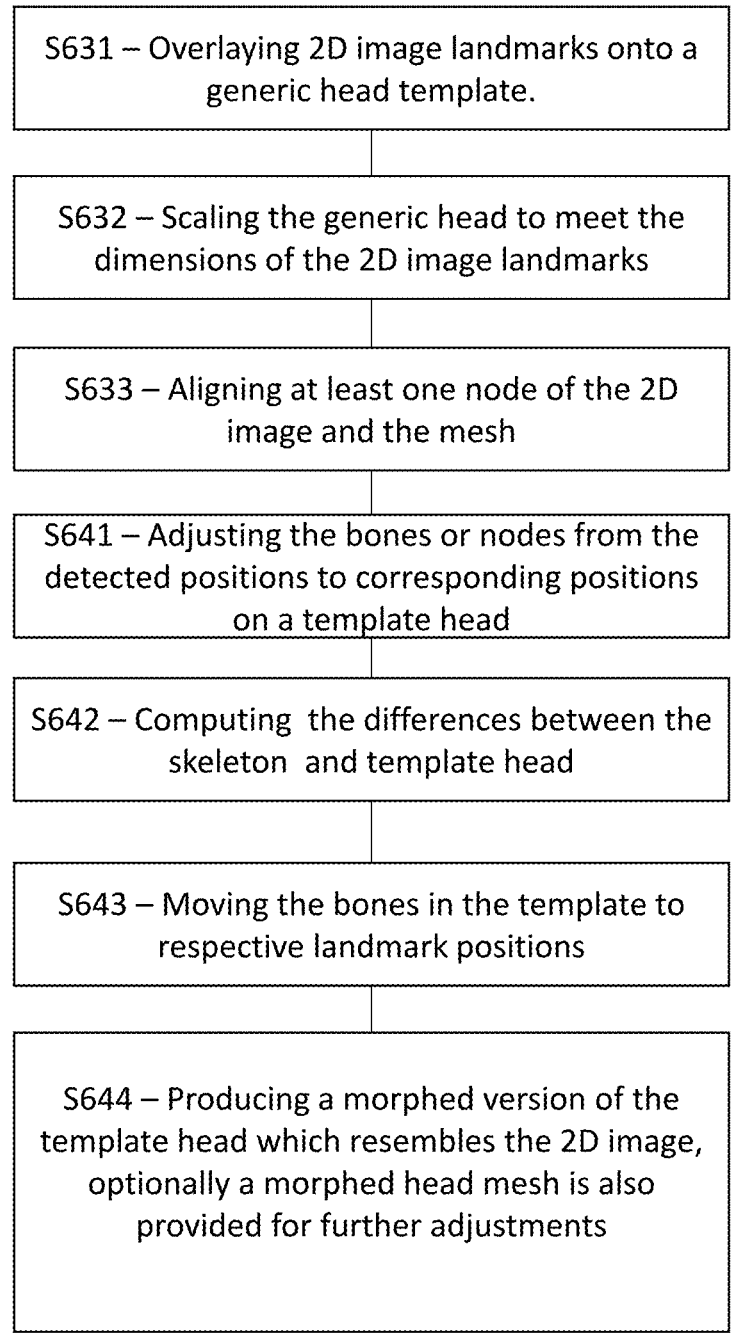
FIG. 6 shows an expanded exemplary flowchart of steps S3 and S4 represented in FIG. 1.

FIG. 6 shows an expanded exemplary flowchart of steps S3 and S4 represented in FIG. 1.

In step S3, a template head is matched to the image to provide a morphed mesh. More specifically, this matching method may comprise the following steps.

In step S631 the landmarks may be used together with a generic template head. That is to say the detected landmarks are overlaid onto a template head.

In step S632 the scale of the skeleton of FIG. 3C is adjusted to the same aspect as the photograph of FIG. 2A as described earlier. By applying this scale the resulting head mesh will be roughly the size of the head in the photograph of FIG. 2B.

In step S633, the photo and mesh are aligned. The alignment may use three or more bones matched to three landmarks of the photograph. It is desirable that the photograph and the mesh overlap and are aligned as close as possible for a good result, therefore several bones and landmarks may be used for the alignment.

In step S4, the morphed template head is visualized on top of the image as a black mesh as shown in FIG. 3D. More specifically, visualising the morphed template head may comprise the following steps.

In step S641 the bones are adjusted from the predefined positions of the template head to the corresponding landmark positions on the photograph.

In step S642, after the model/skeleton is aligned to the input photograph, the differences to describe how much each of the bones in the skeleton need to move to make the generic template head look more like the head in the input photograph is computed. It may be understood that the calculations may be based on any number of bones. It may for example correspond to a predetermined number of bones. The predetermined number may, for example, correspond to the number of bones captured and aligned.

In step S643 the bones in the template are moved to respective landmark positions. The bones being moved by an amount based on the differences computed in step S642. These transformations may typically be performed in 2 dimensions, as the photographs used is 2D. Additional transforms may be applied to make corresponding changes in depth. Depth transforms may be more computationally complex and therefore it may be advantageous to perform any such depth transforms at a server. Moving the bones in the template to respective landmark positions moves any vertices bound by the bones and deforms the head in a relatively symmetrical and realistic way as described earlier. Thus, the detected landmarks cause the template to be modified to resemble the features of the photographed user.

In embodiments, some or all of the bones are moved so as to coincide with the detected landmarks. The vertices which are affected by these bones will move by different amounts depending on the weights that have been assigned that respective vertex for each bone. Each vertex may have two bone indexes and two weights, in some embodiments. The weight of a given vertex may cause it not to be affected by any bone.

In step S644 a morphed version of the template head that resembles what is shown in the image may be provided using the transforms performed in step S643. The relative size may closer match the photo. Alternatively or additionally a morphed head mesh is provided to allow further adjustments and optimisations of the morphed template head.

Once an avatar has been created, it may be controlled in any suitable manner. For example, the avatar may be controlled by any suitable control mechanism. For example, the avatar may be controlled by a joystick, mouse, mousepad, virtual reality input device, accelerometer based control device, steering wheel or the like. It may also be controlled without user input, for example by a computer such a script or AI.

Various embodiments of methods and devices have been described in the foregoing. It should be appreciated that such may be implemented in apparatus, where the apparatus is implemented by any suitable circuitry. Some embodiments may be implemented by at least one memory and at least one processor. The memory may be provided by memory circuitry and the processor may be provided by processor circuitry. Some embodiments may be provided by a computer program running on the at least one processor. The computer program may comprise computer implemented instructions which are stored in the at least one memory and which may be run on the at least one processor.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, and/or CD.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more of any of the other embodiments previously discussed.

The invention claimed is:

1. A computer implemented method, comprising:
   detecting a plurality of landmarks in a two dimensional image of a face; and
   modifying a three dimensional template head comprising texture, bones, animations and blend shapes in dependence on the detected landmarks in the two dimensional image, the template head comprising a plurality of bones corresponding to respective reference landmarks, the modifying comprising moving at least one bone corresponding to a reference landmark in dependence on a respective detected landmark.

2. The computer implemented method as claimed in claim 1, comprising using the modified three dimensional template to provide a three dimensional avatar with a representation of said face.

3. The computer implemented method as claimed in claim 1, wherein a single two dimensional image of the face is used.

4. The method as claimed in claim 1, wherein the method is performed by a user device.

5. The method as claimed in claim 4, comprising capturing the two dimensional image by the user device.

6. The method as claimed in claim 1, comprising performing the method in a server.

7. The method as claimed in claim 6, comprising receiving from a user device the two dimensional image.

8. The method as claimed in claim 1, wherein the modifying comprises modifying the position of the at least one bone only in X and Y dimensions.

9. The method as claimed in claim 1, wherein the template head is scaled in X, Y, and Z dimensions.

10. The method as claimed in claim 1, comprising scaling a size of one of the two dimensional image and the template head in dependence on a size of the other of the two dimensional image and the template head.

11. The method as claimed in claim 10, wherein the scaling comprises determining a first distance between at least one pair of landmarks in the two dimensional image and scaling the two dimensional image in dependence on a comparison of the first distance with a distance between the corresponding landmarks in the template head.

12. The method as claimed in claim 1, wherein at least one of the plurality of bones comprises a weight, the weight determining if or how much the respective bone affects one or more other vertices.

13. A method as claimed in claim 12, wherein a maximum number of the vertices affecting a given bone is two.

14. The method as claimed in claim 1, wherein said moving comprises moving at least one bone to thereby cause one or more respective vertices associated with the respective bone to move thereby modify the template head.

15. The method as claimed in claim 1, comprising generating a head texture from the two dimensional image and applying the generated head texture to the modified three dimensional template head.

16. A device comprising at least one processor and at least one memory including computer program code, the at least one memory and the computer program code configured to, with the at least one processor, cause the device at least to:
  detect a plurality of landmarks in a two dimensional image of a face; and
  modify a three dimensional template head comprising texture, bones, animations and blend shapes in dependence on the detected landmarks in the two dimensional image, the template head comprising a plurality of bones corresponding to respective reference landmarks, the modifying comprising moving at least one bone corresponding to a reference landmark in dependence on a respective detected landmark.

17. The device as claimed in claim 16, wherein the at least one memory and the computer program code are configured, with the at least one processor to use the modified three dimensional template to provide a three dimensional avatar with a representation of said face.

18. The device as claimed in claim 16, wherein the at least one memory and the computer program code are configured, with the at least one processor to use a single two dimensional image of the face.

19. The device as claimed in claim 16, wherein the at least one memory and the computer program code are configured, with the at least one processor to modify the position of the at least one bone only in X and Y dimensions.

20. The device as claimed in claim 16, wherein the at least one memory and the computer program code are configured, with the at least one processor to scale a size of one of the two dimensional image and the template head to a size of the other of the two dimensional image and the template head.

21. The device as claimed in claim 20, wherein the at least one memory and the computer program code are configured, with the at least one processor to determine a first distance between at least one pair of landmarks in the two dimensional image and scale the two dimensional image in dependence on a comparison of the first distance with a distance between the corresponding landmarks in the template head.

22. The device as claimed in claim 16, wherein the at least one memory and the computer program code are configured, with the at least one processor to move at least one bone to thereby cause one or more respective vertices associated with the respective bone to move to thereby modify the template head.

23. The device as claimed in claim 16, wherein the at least one memory and the computer program code are configured, with the at least one processor to generate a head texture from the two dimensional image and apply the generated head texture to the modified three dimensional template head.

24. A non-transitory computer program product comprising a computer-readable storage device including a computer-readable program, wherein the computer-readable program when executed on a processor causes the processor to:
  detect a plurality of landmarks in a two dimensional image of a face; and
  modify a three dimensional template head consisting of texture, bones, animations and blend shapes in dependence on the detected landmarks in the two dimensional image, the template head comprising a plurality of bones corresponding to respective reference landmarks, the modifying comprising moving at least one bone corresponding to a reference landmark in dependence on a respective detected landmark.

* * * * *